United States Patent [19]

Ackley, Sr. et al.

[11] 4,216,714

[45] Aug. 12, 1980

[54] METHOD AND APPARATUS FOR RESTRAINING CAPSULE ADHERENCE TO THE PRINTING ROLL

[75] Inventors: Charles E. Ackley, Sr., Oreland; Charles E. Ackley, Jr., Philadelphia, both of Pa.

[73] Assignee: R. W. Hartnett Company, Philadelphia, Pa.

[21] Appl. No.: 941,292

[22] Filed: Sep. 11, 1978

[51] Int. Cl.[2] .................... B41F 17/36; B65G 47/24

[52] U.S. Cl. .................... 101/40; 101/420; 101/425; 101/110

[58] Field of Search .................... 101/35, 40, 425, 420

[56] References Cited

U.S. PATENT DOCUMENTS

| | | | |
|---|---|---|---|
| 156,982 | 11/1874 | Chambers | 101/420 |
| 463,442 | 11/1891 | Dahm | 101/425 |
| 697,173 | 4/1902 | Roesen | 101/420 |
| 3,103,165 | 9/1963 | Tripp | 101/35 |
| 3,656,200 | 4/1972 | Riley | 101/425 |
| 3,805,696 | 4/1974 | Tsuji | 101/110 |
| 3,871,295 | 3/1975 | Ackley | 101/40 |
| 4,104,966 | 8/1978 | Ackley et al. | 101/40 |

*Primary Examiner*—Clyde I. Coughenour

*Attorney, Agent, or Firm*—Miller & Prestia

[57] ABSTRACT

Method and apparatus for printing upon capsules is disclosed which also includes means for restraining freshly printed capsules from adhering to the printing roll. The capsules are restrained against adherence to the printing roll by the interposition of a stripping plate between the print roll and the capsule transport conveyor at a position immediately downstream from the printing location in which the capsules are brought into contact with the printing roll. In another embodiment of the invention, the printing roll is cleaned by the provision of a rotatable cleaning roll.

6 Claims, 6 Drawing Figures

FIG. 3.
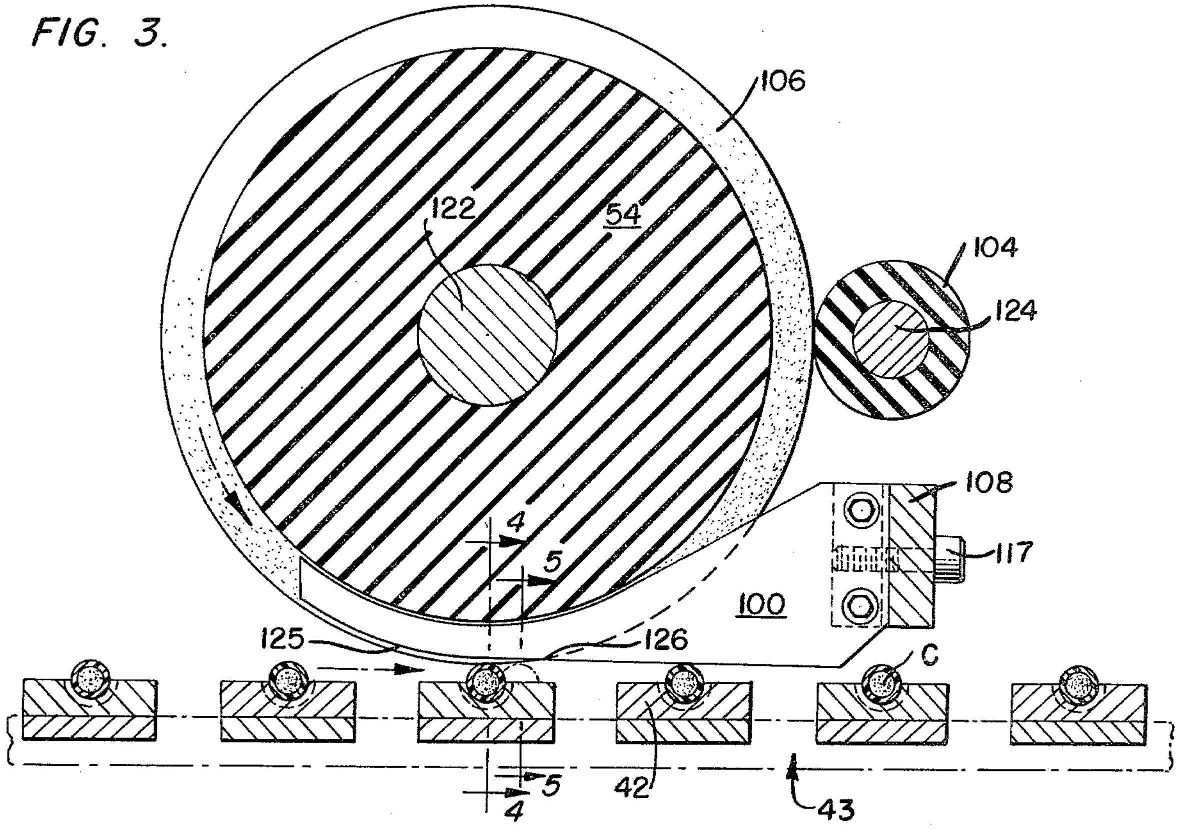
FIG. 4.
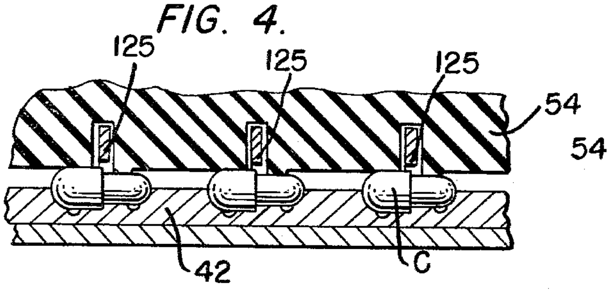
FIG. 5.
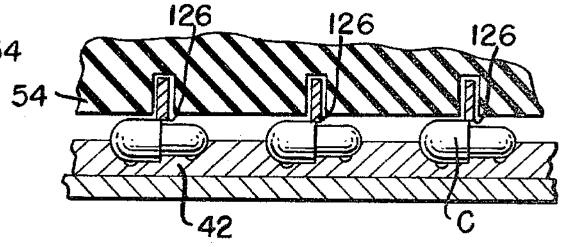
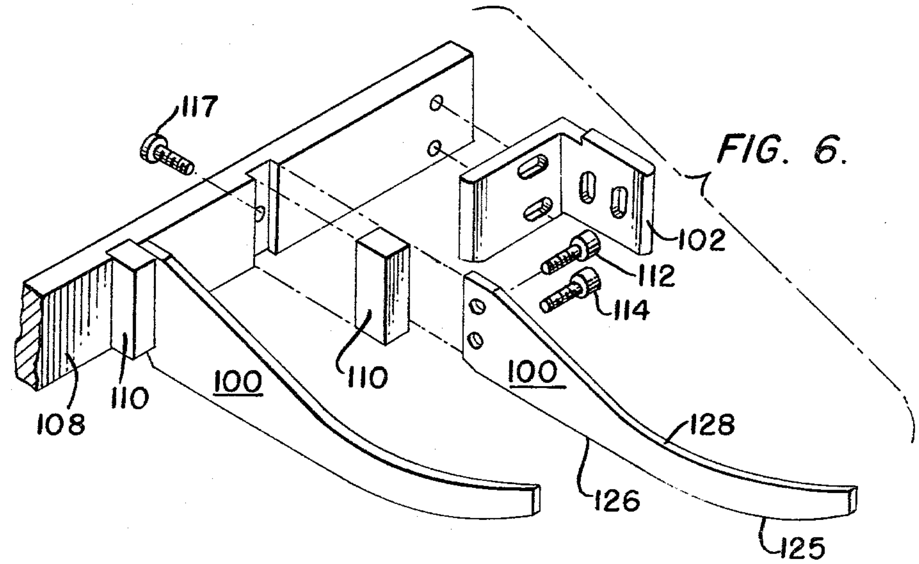
FIG. 6.

METHOD AND APPARATUS FOR RESTRAINING CAPSULE ADHERENCE TO THE PRINTING ROLL

BACKGROUND OF THE INVENTION

1. Field of the Invention

The present disclosure relates to a method and apparatus for restraining capsules from adhering to the printing roll in a capsule transport and printing device. Additionally, means may be provided to remove particulate "trash matter" from the printing roll.

2. Discussion of the Prior Art

Various machines and methods are known whereby a multiplicity of randomly disposed capsules are loaded into a hopper, transferred to a capsule receiving transport device, and then are carried to a printing station where the desired indicia are imprinted upon them. Representative of such devices are U.S. Pat. No. 2,785,786 (Bartlett); U.S. Pat. No. 4,069,753 (Ackley); and U.S. Pat. No. 2,859,689 (Ackley).

Despite the numerous advantages offered by the above prior art devices, certain problems persist with respect to the printing of the capsules thereon. For instance, oftentimes the capsules are in hollow, unfilled form when they are processed on these machines. Due to their light weight nature, as the printing roll contacts the capsules, the ink from the printing roll sometimes acts like a glue so that the capsules adhere to the printing roll and possibly are carried thereon until they are crushed in the nip between the printing roll and the metallic transfer roll. Not only is this a waste of capsules, but the crushed capsule particles may drop into the ink reservoir to contaminate the ink, or the particles may be attracted by electrostatic forces to cling to other machine parts which results in the jamming of certain machine parts and reduced overall machine efficiency.

Accordingly, it is an object of the present invention to provide a capsule transport and printing device which reduces the above described tendency of the capsules to adhere to the printing roll. It is another object of the present invention to provide a means for removing particulate impurities such as broken capsule portions, dust, and the like (hereinafter all such impurities are referred to throughout as "trash matter") from the printing roll.

These and other objects are met by the "Method And Apparatus For Restraining Capsule Adherence To The Printing Roll Of A Capsule Transport And Printing Device" herein disclosed which will be further explained in the appended drawings and the following detailed description.

In the Drawings

FIG. 3 is a fragmentary sectional view taken along the lines and arrows 3—3 of FIG. 1;

FIG. 4 is a fragmentary sectional view taken along the lines and arrows 4—4 of FIG. 1, showing the relationship between the capsules, printing roll, and capsule restraining means in accordance with the invention at the time when the printing roll is in contact with the capsule to imprint indicia thereon;

Figure 1:
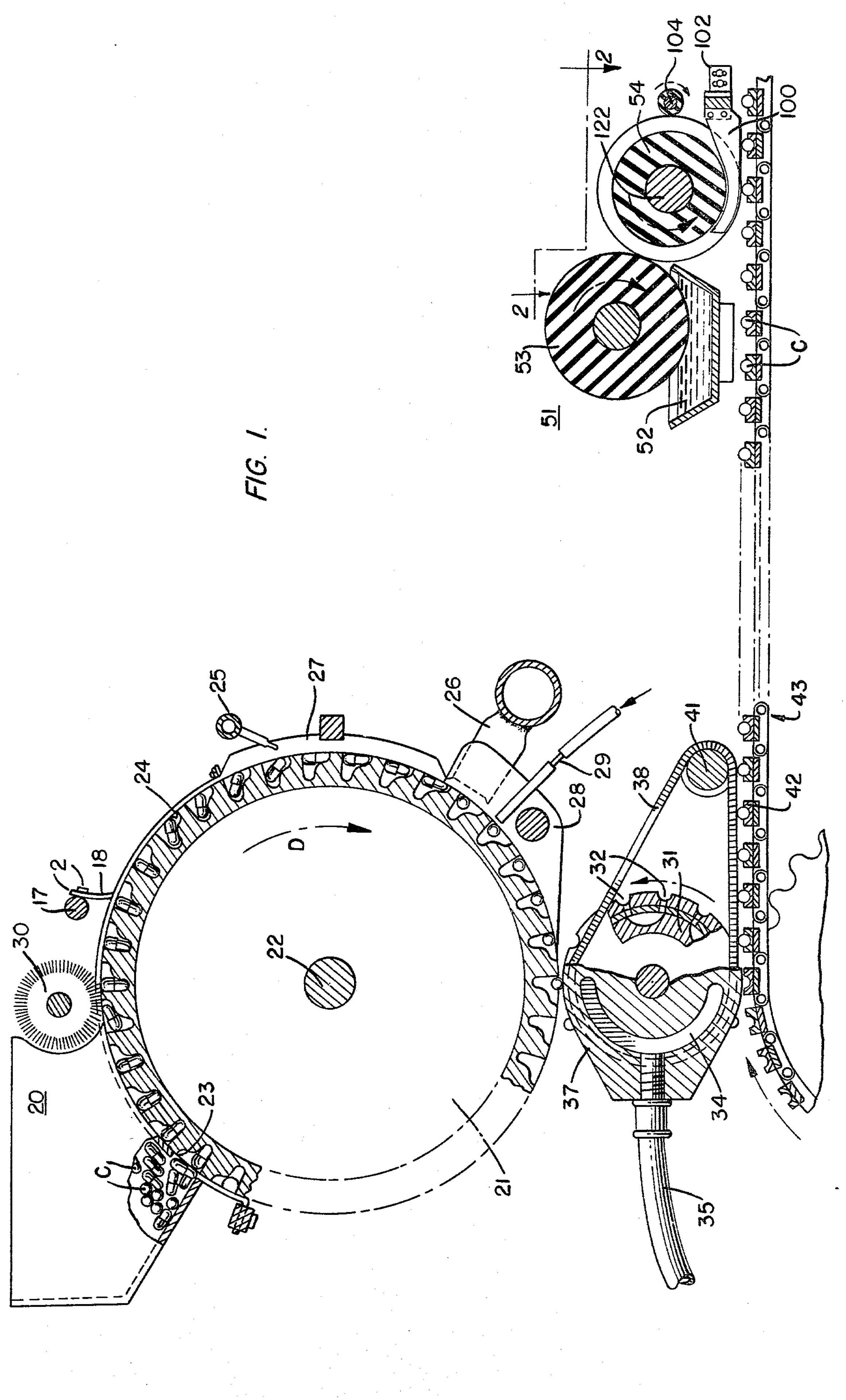
FIG. 1 is a view in side elevation, with certain parts shown in section, illustrating one embodiment in accordance with this invention.

FIG. 5 is a fragmentary sectional view taken along the lines and arrows 5—5 of FIG. 4, showing the relationship between the surface of the printing roll, the capsules, and the capsule restraining means in accordance with the invention momentarily after the printing roll has contacted the capsules; and FIG. 6 is a perspective view of two capsule restraining means in accordance with the invention shown with their associated mounting bar and bracket.

In the specification which follows, specific terms will be used for the sake of clarity, and as descriptions of the specific forms of the invention which have been selected for illustration in the drawings. However, the use of such specific terms, and the use of such specific embodiments in the drawings, is not intended to imply any limitations with respect to the scope of the invention which is defined in the claims.

It is to be appreciated that in the disclosed device, the capsules are rectified by either a vacuum or by a vacuum and cooperating air jet. Details as to the rectification process may be discerned by reading either U.S. Pat. No. 4,104,966 (Ackley et al), or U.S. Pat. No. 3,871,295 (Ackley). The disclosures of these patents are hereby incorporated by reference. Thus, details as to the rectification process per se are omitted herefrom.

Turning to FIG. 1, the number 20 designates a capsule carrying hopper which is mounted on a suitable support (not shown), above a portion of a rotatable cylinder 21 which is mounted for rotation about an axle 22. A motor (not shown) is provided for rotating the cylinder 21. The hopper 20 has an opening as indicated at 23 for delivery of capsules to a plurality of equally spaced, generally elongated cavities 24 which are formed in and extend in rows across the outer surface of the rotatable cylinder 21. It will be observed that the capsule cavities have elongated portions which extend in a generally radial direction, allowing the capsules to be received by the cylinder 21 in generally radial positions. Some of the capsules naturally fall into the cavities 24 in an upright position, with the body portions above the cap portions, while other capsules fall naturally into the cavities 24 in an inverted position, with the cap portions above the body portions.

Turning to the uppermost portion of the cylinder 21, the number 30 designates a rotating brush which serves to straighten out any capsules that may be lying in an angular position, as opposed to the upright position illustrated in FIG. 1. Just downstream of the brush 30 (in the direction D) is a further device, as shown within the circled arrow 2, which further serves to position the capsules in an upright position within their pockets 24.

As shown in FIG. 1, a cross-bar 17 is provided, carrying a plurality of flexible plastic strips 18, the lower tip ends of which are free, and which are arranged to contact the surface of the cylinder 21. It will be appreciated that with either the cap portion $C_p$ in its upright position, or the body portion $B_y$ in its up position, the plastic strip 18 contacts the capsule and urges them into upright positions within the pockets 24.

It is to be noted that the cavities 24 are arranged in rows extending longitudinally in the machine direction, and also that a plurality of separate, spaced-apart, substantially parallel rows are provided. Extending along each such row is a groove in which is positioned an elongated guide wire 19. The guide wires 19 are all parallel to each other, and are positioned in a manner to restrain sidewardly directed tilting movement of the upper portions of the capsules. The wires 19 extend completely underneath the hopper 20, underneath the brush 30, underneath and to one side of the individual fingers 18, and have a downstream termination at the upstream portion of the gaging blocks 27, which will be described in further detail hereinafter. (In this specification, the expressions "upstream" and "downstream" are used with reference to the direction of capsule travel on the mechanism. This direction is easily traced by following the arrows which appear in FIG. 1).

The number 25 designates a plurality of longitudinally directed air jets which are arranged to provide blasts of air in a direction generally along the direction D in which the rotatable cylinder 21 is rotating. The number 26 designates vacuum ducts having elongated openings, which are arranged to draw air substantially crosswise of the machine, and which effectively rectify the capsules in a crosswise direction, as appears in FIG. 1.

The number 27 designates a gaging block which serves to prevent substantial tilting movement, in the direction D, of those capsules which are arranged caps-up in their pockets 24, but to permit such movement of those capsules which are arranged bodies-up, under the influence of air from the jets 26. Gaging block 27 also assures that those capsules which have tilted to a substantially tangential arrangement will be retained in such condition as they continue to move downwardly in the direction D.

The number 28 designates a guide block for the capsules. It is shown as carrying an air inlet 29 for secondary air, which coacts with the vacuum ducts 26 as will be further described. Guide block 28 retains all capsules in position within their pockets, at the lower portion of the cylinder 21, as the capsules continue to move in the direction D.

Located directly beneath the cylinder 21 is a transfer cylinder 31 having a plurality of pockets 32, and an axle 33 about which the transfer cylinder 31 rotates. The pockets 32 are shaped, spaced and arranged to receive capsules transferred from the pockets of cylinder 21. This transfer is assisted by a stationary vacuum shoe 34 which, as shown, extends approximately 180° around the periphery of the transfer cylinder 31. A vacuum connection 35 is provided for the purpose of drawing vacuum upon the capsules in the pockets 32, by way of openings 36 at the bottoms of the pockets 32. The transfer cylinder 31 is provided with at least a pair of grooves 37, spaced axially from each other, and located adjacent each of the ends of the transfer cylinder 31. A pair of extensible flexible members, shown as chain 38 in FIG. 1, are positioned in each of these grooves and stretched around an idler shaft 41. The chains 38 are positioned in a manner to pry the capsules C out of the pockets 32 at the bottom of their path of movement on the transfer cylinder 31, so that they move downwardly onto corresponding pockets of carriers on conveyor 43. The chain 38 is preferably an electrically conducting, extensible chain, which can be stretched around the idler shaft 41, and which is grounded to the idler shaft 41 and/or to the transfer cylinder 31, in a manner to discharge static electricity.

The number 51 generically designates an offset printing apparatus which is ideally adapted for wrap-around printing in accordance with this invention. It includes an ink reservoir 52 which contains ink or other fluid to be applied to the capsules, a transfer roll 53 which is preferably etched or similarly indented or provided with markings which have capacity to retain fluid and a printing roll 54 which is continuously rotated in the direction indicated by the arrow thereon, in contact with the capsules as they move underneath the roll 54, carried by their carriers 42 on the conveyor 43. In the spin printing process, one or more elongated forms of indicia are preferably printed on the outer surface of the capsule by adjusting the speed of rotation of the roll 54 so that its surface speed is considerably greater than the speed of movement of the conveyor 43. Preferably the capsule carrier 43 is composed of a slippery material such as polytetrafluoroethylene for example, which has a coefficient of friction which is less than that of the printing roll, thus permitting the capsule to rotate freely upon its axis under the frictional influence of the printing roll 54 during the spin printing process.

Stripper plate 100 mounted on bar 108 is provided to restrain capsules against adherence to the printing roll after the desired indicia have been imprinted thereon as will be more fully explained hereinafter. Trash cleaning roll 104, rotating in the same direction as printing roll 54, is provided to remove dust, fragments of broken capsules, etcetera from printing roll 54.

Turning now to FIGS. 2 through 6, it will be appreciated that printing roll 54 comprises a plurality of circumferential grooves 106 in which, portions of the stripper plates 100 are to be disposed. Stripper plates 100 are mounted on bar 108 by aid of blocks 110 and screws 112, 114. Block 110 is attached to bar 108 by means of screw 117. Bar 108 is attached to side frame members 116, 118 by brackets 102.

Figure 2:
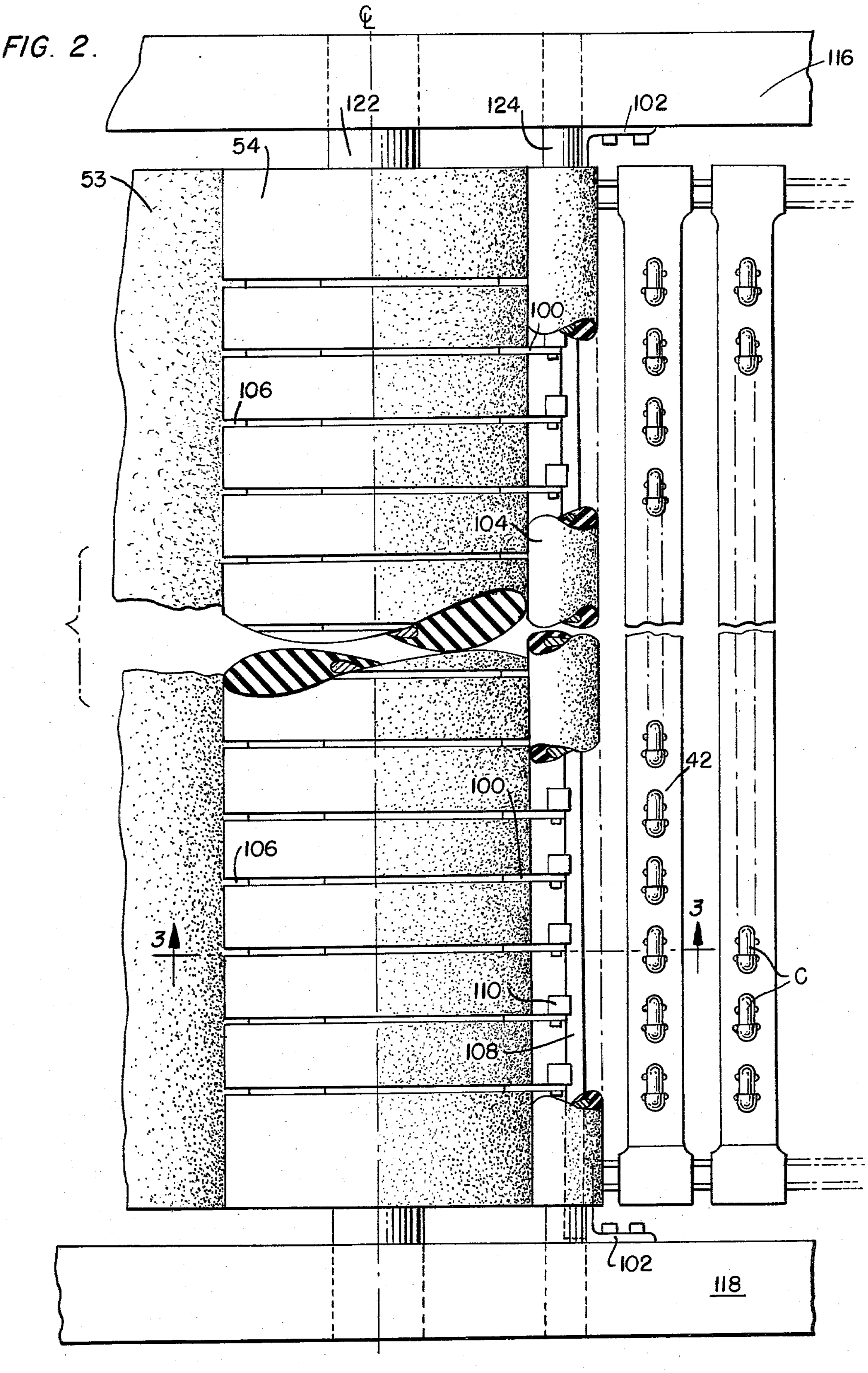
FIG. 2 is a fragmentary sectional view taken along the lines and arrows 2—2 of FIG. 1.

With specific reference to FIG. 2, it can be seen that capsules C are carried by conveyor 43, carrying conveyor bar 120 and associated pockets 42. Transfer roll 54 is mounted on shaft 122 which is journaled in side frame members 116, 118. Trash cleaning roll 104 is mounted on shaft 124 which is also journaled in the side frame members. It will be appreciated that trash, etcetera will be momentarily caught in the nip between the rolls 54, 104 and then eliminated, by gravity drop, from the machine. Preferably, the periphery of roll 104 is provided with a resilient surface.

With emphasis on FIGS. 3 through 5, it can be seen that stripper plate 100 is received in one of the grooves 106. The capsule is imprinted upon as shown in FIG. 4 due to the fact that the surface of roll 54 contacts the capsule. Arcuate leading bottom edge 125 of stripper plate 100 does not bear upon the capsule so as not to interfere with the printing operation. However, as shown in FIG. 5, planar trailing bottom edge portion 126 of stripper plate 100 does bear against the capule after the capsule has been moved slightly downstream from the printing location depicted in FIG. 4. In this manner, the capsule is restrained from adhering to printing roll 54 and from being carried thereby. The top edge 128 of stripper plate 100 is generally arcuately shaped and spaced a small distance from the surface of printing roll 54 so as not to interfere with rotation of roll 54.

It will be appreciated that individual stripper plates 100 and associated grooves 106 are provided for each pocket on carrier 42. In this way, we have been able to substantially eliminate sticking or adhering to roll 54 of any of the capsules in the transported array.

With reference to FIG. 6, arcuate top edge 128, arcuate leading bottom edge 125, and generally planar trailing bottom edge portion 126 of the stripper plate 100 are clearly depicted. It is important to note that as the capsule is presented beneath printing roll 54, it is completely unaffected by the interposition of arcuate leading edge 125 between the printing roll 54 and the capsules C. However, after the capsule has been printed, it is moved in a downstream direction and is then prevented from sticking to roll 54 since trailing edge portion 126 bears upon the printed capsule and forces it to remain within its carrier 42.

Although this invention has been described in conjunction with certain specific forms and modifications thereof, it will be appreciated that a wide variety of other modifications can be made without departing from the spirit of the invention. For example, some of the features of the invention may be used independently of other features. Indeed, it may be possible to use the novel capsule restraining means in those applications in which rectification of the capsules is not at all desired.

Additionally, in accordance with the invention, various equivalent elements may be substituted for those shown and specifically described, and in many instances parts may be reversed in ways which will become apparent to those skilled in the art, all without departing from the scope and spirit of this invention as defined in the appended claims.

We claim:

1. Capsule transport and printing device comprising a hopper into which a multiplicity of randomly arranged capsules are to be loaded, printing means located downstream from said hopper and including a printing roll adapted to imprint desired indicia on said capsules, said printing roll having both an approach and exit side, transport means arranged to receive capsules from said hopper and to transport them to said printing means, and capsule restraining means adjacent said printing roll to restrain capsules against adherence to said printing roll after the desired indicia have been imprinted on them, said capsule restraining means comprising a stripper plate interposed between said printing roll and said transport device, said printing roll comprising at least one circumferential groove therein, said stripper plate comprising a substantially arcuate top surface and a bottom surface, said substantially arcuate top surface being received in said circumferential groove, said bottom surface having a leading generally arcuate shaped edge totally disposed within said circumferential groove and disposed proximate the approach side of said printing roll and a substantially planar trailing edge positioned proximate the exit side of said printing roll and adapted to bear upon said capsules after they have been imprinted upon.

2. Capsule transport and printing device as recited in claim 1 further comprising cleaning means for removing trash matter from said printing roll.

3. Capsule transport and printing device as recited in claim 2 wherein said cleaning means comprises a rotatable cleaning roll adjacent said printing roll.

4. Method of printing upon capsules comprising:

(a) Loading said capsules into a hopper, (b) transporting said capsules from said hopper to a print roller, (c) passing said capsules to a print location beneath said print roller whereby the desired indicia will be imprinted on said capsules, and (d) restraining said capsules against adhesion to said printing roll by: providing a circumferential groove in said printing roll, placing a substantially arcuate top edge of a stripper means inside of said groove, placing a substantially arcuate bottom edge of said stripper means within said groove, and contacting said capsules with a substantially planar trailing edge portion of said bottom edge of said stripper means after the capsules have been imprinted thereon.

5. Method as recited in claim 4 further comprising the step of (e) removing trash matter from said printing roll.

6. Method as recited in claim 5 wherein said step (e) comprises contacting said printing roll with a resilient cleaning roll which rotates opposite to the rotational direction of said printing roll.

* * * * *

UNITED STATES PATENT AND TRADEMARK OFFICE
CERTIFICATE OF CORRECTION

PATENT NO. : 4,216,714
DATED : August 12, 1980
INVENTOR(S) : Charles E. Ackley, Sr., et al It is certified that error appears in the above-identified patent and that said Letters Patent are hereby corrected as shown below:

In column 3, line 23, please delete "26" and insert --25--

Signed and Sealed this

*Eleventh* Day of *November 1980*

[SEAL]

*Attest:*

SIDNEY A. DIAMOND

*Attesting Officer* *Commissioner of Patents and Trademarks*